Sept. 7, 1926.

J. C. SHARP

PLAIN OILER

Filed May 9, 1924

1,598,939

Inventor,
John C. Sharp.
By C. J. Stockman
Attorney

Patented Sept. 7, 1926.

1,598,939

UNITED STATES PATENT OFFICE.

JOHN CESSNA SHARP, OF CHATTANOOGA, TENNESSEE.

PLAIN OILER.

Application filed May 9, 1924. Serial No. 711,984.

A fundamental purpose of this invention is to provide an oiling means which will be characterized (1) by extreme simplicity of construction; (2) by remarkable economy in the use of oil while assuring an adequate supply of oil to the part to be lubricated at all times; and (3) by an entire absence of valvular or other elements calling for thought or attention in order that the flow of oil to the part to be lubricated may be regulated. A particular purpose of the invention is to provide an oiling means having the foregoing characteristics and which additionally may be used wherever the use of an oil cup having a lateral neck should be employed; and another particular purpose of the invention is to provide a most effective and economical means for perfectly lubricating a spring shackle or the like which will call for no attention, except the filling of the oil reservoir at infrequent intervals.

These several purposes are realized from the construction illustrated in the accompanying drawings, in which:—

Figure 1:
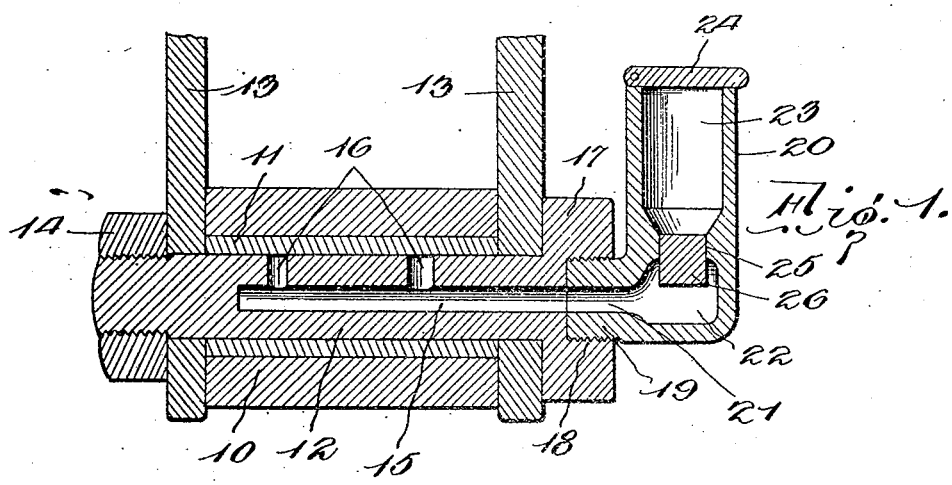
Figure 2:
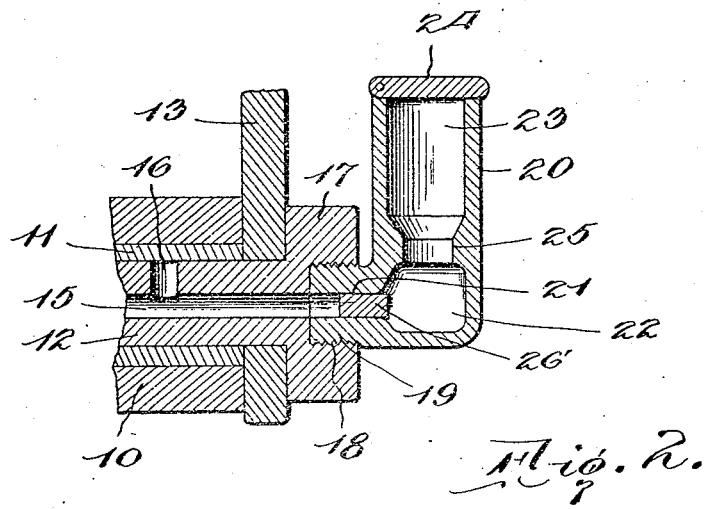

Fig. 1 is a sectional view of a spring shackle bolt of an automobile having my oiler applied thereto; and Fig. 2 is a similar view of a fragment of the same parts but with a slight change in the location of the oil feeding and filtering element.

Since all of the parts are the same in both embodiments of the invention, differing only in the location of the oil feeding and filtering elements, the same characters of reference are employed to denote corresponding parts in both figures, except that the oil feeding and filtering plug is marked 26 in Fig. 1 and 26′ in Fig. 2.

10 designates the rolled end of the long leaf of an automobile spring, 11 the bushing, 12 the shackle bolt and 13 the shackle links connecting the spring with the frame. The bolt 12 and a nut 14 on the end thereof, secure the spring and the shackle links together. Within the bolt 12 is an oil duct 15 having branch ducts 16 leading to the bushing. The head 17 of the bolt is hollow and is provided with an interiorly threaded portion 18 to receive the threaded end 19 of the oil feeder cup 20.

This oil feeder cup is a type of cup readily procurable anywhere in the open market. It is one form of the well known "plain oiler", so called, being that form thereof having a laterally extending neck 21 externally screw threaded at its outer end to attach it in operative relationship with the part to be lubricated. It is of inexpensive construction and its use, therefore, as an element of the present lubricating means contributes to one of the important purposes of this invention, namely, economy of manufacture. The only other element embodied in the invention is a wooden plug (marked 26 in Fig. 1 and 26′ in Fig. 2) suitably arranged within the oil cup 20 and serving to assure a slow and constant supply of oil to the part to be lubricated and to filter the oil in its passage to said part and thereby assure that it will be received by the part to be lubricated in a condition free from sand, grit, etc.

This plug is formed of a close grained wood, white pine preferred, with the grain running lengthwise of the plug. It is preferably subjected to a preliminary treatment to open its pores by removing resinous and other substances therefrom which would interfere with a constant flow of oil therethrough. A suitable treatment consists in subjecting it to a bath of oil heated to a temperature which will remove resinous and other liquid substances without charring or scorching the wood. It is then preferably but not necessarily filled with a suitable oil, as the lubricating oil in connection with the feeding of which it is to be used, the principal purpose of this being to cause it to more readily attract and feed the oil to the bearing when in use.

This plug is mounted in a suitable part of the oil cup in operative relation with the reservoir 23 and outlet opening of the cup, to control the supply of oil through said outlet to the part to be lubricated. The preferred arrangement is, as shown in Fig. 1, in the reduced opening 25 between the reservoir 23 and the chamber 22, i. e., at the entrance to the neck portion of the cup. Although it may be arranged in the neck 21 itself, preferably near the outlet end or port of the latter, as shown in Fig. 2. In any case, its fit in the opening which received it is a close one, and is preferably so close that the wood of the plug is under a substantial degree of compression. It will be noted that it may be driven to its place, or otherwise forced to its seat in the opening 25, when the cap 24 of the cup is raised, the raising of said cap giving free access to said opening. It is obvious that it may be inserted in the neck 21 without uncovering any part of the structure, when the cup is removed from the part it is to lubricate.

The simplicity of this oiler is obvious. It consists only of the ordinary so-called plain oiler of the type having a neck at an angle to its body, with the dropper, sometimes forming a part of said oiler, removed and a plug of a particular and inexpensive character inserted.

Its efficiency in use is remarkable, the structure assuring a slow but sure feed of oil in such quantity as to perfectly lubricate the part needing oil, delivering to said part neither too much nor too little oil, the plug acting automatically to regulate the flow of oil from the cup to the part to be lubricated and as a filter for the oil. The necessity of the use of any extraneous valvular or other part to control the flow of oil and of any additional means to filter the oil is thereby eliminated.

The plug is always in its place and always operative to control the flow of oil from the cup and as there is no part to be adjusted, and no occasion for the adjustment of any part, to control the flow of oil, at any time, it follows that time and thought of the attendant is saved and danger of oil wastage due to lack of proper attention is avoided, this resulting not only in a saving of the attendant's time and thought and of oil but also in the avoidance of the gumming up of the part to be lubricated which follows an oversupply of oil thereto.

The savings in the use of oil is remarkable, one filling lasting a long time.

In short, the structure has many advantages of most practicable nature and especially for the use of automobilists as it will assure the perfect lubrication of the part to which it is applied without any attention whatever, other than refilling of the oil cup at very infrequent intervals.

Having thus described the invention, what I believe to be new and desire to secure by Letters Patent, is:—

1. An oil cup having an oil reservoir and a hollow laterally extending neck in communication with the reservoir, and an oil feeding wooden plug tightly fitted in a member of the cup and operating automatically to regulate the supply of oil to the part to be lubricated, said plug being in a position to be out of contact with the bearing to be lubricated.

2. An oil cup having an oil reservoir and a hollow laterally extending neck in communication with the reservoir, and an oil feeding wooden plug formed of a close grained wood having its pores running longitudinally of the plug tightly fitted in a member of the cup and operating automatically to regulate the supply of oil to the part to be lubricated, said plug being in a position to be out of contact with the bearing to be lubricated.

3. An oil cup having an oil reservoir and a hollow laterally extending neck in communication with the reservoir, and an oil feeding wooden plug formed of a close grained wood having its pores running longitudinally of the plug and from which the resinous substance has been removed, tightly fitted in a member of the cup and operating automatically to regulate the supply of oil to the part to be lubricated.

4. The combination with a part to be oiled, including a member having a head and provided with a longitudinal opening which extends through the head and into said member, an oil cup having a reservoir and a hollow neck at an angle to the reservoir the neck secured to the head with its opening in alinement with the opening through said head, and a wooden oil feeding plug tightly fitted in the cup and in operative relation with the reservoir and neck and operating automatically to regulate the supply of oil to the opening in said member.

In testimony whereof I affix my signature.

JOHN CESSNA SHARP.